United States Patent [19]
Gozdz et al.

[11] Patent Number: 5,552,239
[45] Date of Patent: Sep. 3, 1996

[54] RECHARGEABLE BATTERY STRUCTURE AND METHOD OF MAKING SAME

[75] Inventors: Antoni S. Gozdz, Tinton Falls; Caroline N. Schmutz, Eatontown; Jean-Marie Tarascon, Martinsville; Paul C. Warren, Far Hills, all of N.J.

[73] Assignee: Bell Communications Research, Inc., Morristown, N.J.

[21] Appl. No.: 297,349

[22] Filed: Aug. 29, 1994

[51] Int. Cl.$^6$ .................................................. H01M 10/38
[52] U.S. Cl. ........................... 429/94; 429/192; 29/623.1
[58] Field of Search ........................... 429/94, 192, 127, 429/162; 29/623.5, 623.1

[56] References Cited

U.S. PATENT DOCUMENTS

| | | | |
|---|---|---|---|
| 4,333,994 | 6/1982 | Urry | 429/94 |
| 4,604,333 | 8/1986 | Ikeda et al. | 429/94 |
| 4,664,989 | 5/1987 | Johnson | 429/94 |
| 4,714,665 | 12/1987 | Siegel et al. | 429/192 |
| 4,761,352 | 8/1988 | Bakos et al. | 429/94 |
| 4,929,519 | 5/1990 | Catotti | 429/94 |
| 4,963,445 | 10/1990 | Marple et al. | 429/94 |
| 5,008,165 | 4/1991 | Schmode | 429/94 |
| 5,100,746 | 3/1992 | Muller et al. | 429/94 |
| 5,219,680 | 6/1993 | Fauteux | 429/192 |
| 5,296,318 | 3/1994 | Gozdz et al. | 429/94 |

*Primary Examiner*—John S. Maples
*Attorney, Agent, or Firm*—Leonard Charles Suchyta; Lionel N. White

[57] ABSTRACT

A rechargeable battery comprises a laminate electrolytic cell in which a flexible plasticized polymer hybrid electrolyte/separator layer is interposed between positive and negative electrode layers of lithium-ion intercalating polymeric matrix compositions bearing respective current collector foils. An elongate laminar cell is formed into a unified battery by means of an initial transverse fold disposing one electrode/collector within the structure and with subsequent sequential folds spiralling the cell, without need for interposed insulation, outwardly toward the electrode ends where the collectors accommodate battery terminals. Immersion of the structure in a solvent extracts the polymer plasticizer which is subsequently replaced by contact with lithium salt solution electrolyte to activate the battery.

15 Claims, 5 Drawing Sheets

RECHARGEABLE BATTERY STRUCTURE AND METHOD OF MAKING SAME

BACKGROUND OF THE INVENTION

The present invention relates to electrolytic cells comprising polymeric composition electrode and electrolyte members and to a method of economically making such cells. In particular, the invention relates to rechargeable lithium battery cells comprising an electrode-intermediate polymeric separator element containing an electrolyte solution through which lithium ions from a source electrode material move between cell electrodes during the charge/discharge cycles of the cell. The invention is particularly useful for making laminar cells in which the electrodes take the form of layers comprising compositions of lithium and other compounds capable of intercalating lithium ions, and wherein an inter-electrode membrane or layer comprises a plasticized polymeric matrix made ionically conductive by the incorporation of an organic solution of a dissociable lithium salt which provides ionic mobility.

Early rechargeable lithium cells utilized lithium metal electrodes as the ion source in conjunction with positive electrodes comprising compounds capable of intercalating the lithium ions within their structure during discharge of the cell. Such cells relied, for the most part, on porous separator structures or membranes which physically entrained a measure of fluid electrolyte, usually in the form of a solution of a lithium compound, and which also provided a means for preventing destructive contact between the electrodes of the cell. Sheets or membranes ranging from glass fiber filter paper or cloth to microporous polyolefin film or nonwoven fabric were saturated with solutions of a lithium compound, such as $LiClO_4$, $LiPF_6$, or $LiBF_4$, in an organic solvent, e.g., propylene carbonate, diethoxyethane, or dimethyl carbonate, to form such electrolyte/separator elements. The fluid electrolyte bridge thus established between the electrodes provided the necessary $Li^+$ ion mobility for conductivities in the range of about $10^{-3}$ S/cm.

Subsequent developments, such as described in U.S. Pat. No. 5,296,318, provided electrolytic battery cells which have both positive and negative electrodes comprising compounds capable of intercalating ions and include strong, non-porous, flexible polymeric electrolytic cell Separator membrane materials which contain lithium salt electrolyte solutions and remain functional over temperatures ranging well below room temperature. These electrolyte membranes are employed either as separator elements with mechanically assembled battery cell components or in composite battery cells constructed of successively coated layers of electrode and electrolyte compositions. In each of these implementations, the polymeric electrolyte/separator elements often contain the lithium electrolyte salts at the time of cell assembly and, due to the hygroscopic nature of those salts, necessitate extraordinary environmental conditions during cell assembly.

More recent developments have provided a manner of utilizing these improved polymeric electrolyte membrane and electrode compositions which substantially eliminates the need for special environmental controls during cell manufacture. Typically, the polymeric electrode and electrolyte/separator layers are thermally bonded to form a laminated cell structure which ensures optimum interlayer functionality and enables the postponement of sensitive electrolyte incorporation until the final stages of battery construction or even later in its application as an activating fluid.

The laminate layer structure of these cells also provides a ready means for incorporating electrical current collector elements, usually as additional conductive layers or foils which can add further strength to the cell assembly. In order to provide optimum access of activating electrolyte solution to the electrode and separator layers, it is usually preferred that at least one of these collector layers, when comprising a normally impermeable material such as metal foil, be of an open grid or mesh structure, perforated, or otherwise of similar reticulate form to allow fluid permeation.

Since the capacity of laminar battery cells varies with electrode area, it is desirable to maximize that parameter in structuring battery products. However, obvious practical limitations dictate that overall linear battery dimensions be minimized. Thus, present battery fabrication operations strive to compact the laminar cell into a structure of minimum volume while maintaining the desired inter-electrode area. A common method of achieving such a balance has been to roll thin, flexible cell elements into a spiral coil, such as in U.S. Pat. No. 4,929,519, which, in effect, compacts the longitudinal dimension of the cell. A disadvantage suffered in this practice is the necessity of interleaving an insulating layer within the coil to prevent the direct contact of the opposite pole electrodes with resulting disfunction of the cell. Not only does such a practice necessitate the handling of a further battery element, it also results in the added weight and volume of a nonproductive battery component.

Another common expedient entails the use of multiple folds of individual electrode and separator elements, such as in U.S. Pat. No. 4,761,352, which unfortunately often results in similar unproductive redundancy of a significant portion of electrode and collector materials.

The present invention obviates such disadvantages by providing an improved form of laminar battery structure which can be fashioned of the preferred polymeric electrode and electrolyte elements while utilizing economical spiral fabrication techniques which are unhampered by the necessity for inter-electrode insulation elements. Further improvement is provided by a significant reduction in the expanse of conductive collector elements and in the amount of non-productive battery weight represented by such elements.

SUMMARY OF THE INVENTION

The compact, high-capacity rechargeable battery structure of the invention comprises an elongate, flexible laminar electrolytic cell which is initially folded laterally upon itself in order to situate one of the pair of electrodes and its associated current collector element within the folded body and is thereafter sequentially folded, or rolled, in the longitudinal direction toward the now adjoining pair of cell ends to achieve the desired ultimate shape. Contacts affixed to the respective electrodes of the cell serve as battery terminals when the cell is sealed within a protective container or enclosure.

The basic laminar structure of a cell comprises the usual electrode and interposed separator/electrolyte elements with outer current collector elements normally coextensively contacting the respective electrodes and serving as the opposite poles of the cell. These elements may be individually composed of materials described in the specification of above-mentioned U.S. Pat. No. 5,296,318, commonly-owned herewith and incorporated herein by reference. Preferably, the hybrid separator/electrolyte element composition is formulated without a lithium salt component in order to avoid the deleterious effects of atmospheric humidity.

Rather, the composition comprises only the polymer and one or more solvent, or plasticizer, components, such as ethylene carbonate (EC), propylene carbonate (PC), dimethyl carbonate (DMC), or dibutyl phthalate (DBP). Further, the composition may advantageously include an inert filler, such as fumed silanized silica, which provides additional physical strength and enhances subsequent absorption of activating electrolyte solution.

The electrode compositions preferably comprise the same type of polymer matrix in order to enhance the compatibility and subsequent laminating adhesion between the electrode and separator elements of the cell. The active electrolytic components of the electrodes include any of those lithium-ion intercalating materials which have shown good results in earlier cell compositions. Notable are the tertiary lithium metal oxide intercalation compounds comprising manganese, cobalt, or nickel and the carbon counter-electrode materials including petroleum coke and graphite.

Current collector elements useful in the cells continue to be the respective copper, aluminum, nickel, and stainless steel combinations which have served well in existing cell structures. One or both of a selected collector pair are preferably foils of perforated or expanded mesh formation in order to promote the permeation of solvents and other fluid compositions during the latter operations in the fabrication of the present battery structures. The weakening of collector elements otherwise suffered as a result of their reticulate structure is adequately compensated in one aspect of the invention.

At the completion of a basic cell assembly, either by direct coating of element compositions or overlaying of individual cell element layers or membranes with intermediate adhesive or subsequent thermal lamination, a unitary laminar electrolytic cell structure is obtained, usually in an elongate form ready for a size-compression operation. At this stage in a battery fabrication process, rather than folding or rolling the cell sequentially from one end toward the other with the insertion of an additional insulating membrane, the process of the invention calls for an initial transverse folding of the cell, generally in the region of its longitudinal center, in order to bring into contact within the folded structure the two portions of the cell electrode/collector surface constituting one of the poles of the cell. In this manner any subsequent contact between opposite polarity surfaces of the cell, and resulting short-circuiting, is substantially avoided.

The cell may thereafter be shaped as desired; for instance, by sequential folding of the elongate body which proceeds from the transverse fold toward the adjacent free ends to obtain a generally flat or low-profile rectangular battery, If a cylindrical battery is desired, a rolling operation may be substituted for the sequential folding. When the shaping has been completed, the thermoplastic polymer nature of the layer matrices may again be utilized to unify the compact laminar structure under the application of heat and pressure.

The battery body thus formed may be stored for any length of time prior to final processing in which an electrolyte salt solution is introduced in order to initiate electrolytic activity. In a preferred first operation in such a process, the compact cell/battery body is contacted with a solvent which is differentially active with respect to the matrix polymer plasticizer while substantially inert to the polymer itself. In this manner the plasticizer, as well as other materials of extraneous nature, are extracted form the body, thereby uniquely conditioning the polymer matrix to absorb an activating amount of a desired electrolyte solution, usually comprising one or more lithium salts, such as $LiPF_6$, $LiBF_4$, or other such compounds commonly used to impart requisite ionic conductivity to the cell compositions. The cell body may as a matter of processing preference be enclosed or enveloped in a protective battery casing either before or after electrolyte activation.

It is primarily in the interest of promoting the ready flow of extraction and activating fluids throughout the cell body that perforate or mesh style conductive collector foils are employed. An additional advantage enjoyed from such collector foils is a reduction in the contributive weight of electrolytically inactive cell components with a resulting improvement in the overall power/weight capacity of the battery. Further capacity through weight reduction is achieved in the present invention by elimination of portions of collector foil which would otherwise redundantly reside in areas of contact between electrode surfaces resulting from the folding operations. A single common collector element thus suffices in such circumstances. A similar advantage may be obtained with the additional benefit of reduction in the danger of fracture of a delicate reticulated collector foil when the sequential cell folding is effected in a manner so as to predominantly situate the foil at the interior of such folds.

The particular advantageous aspects of the present invention will be more apparent in the following description and examples of specific representative battery cell embodiments.

BRIEF DESCRIPTION OF THE DRAWING

The present invention will be described with reference to the accompanying drawing of which.

DESCRIPTION OF THE INVENTION

Figure 1:
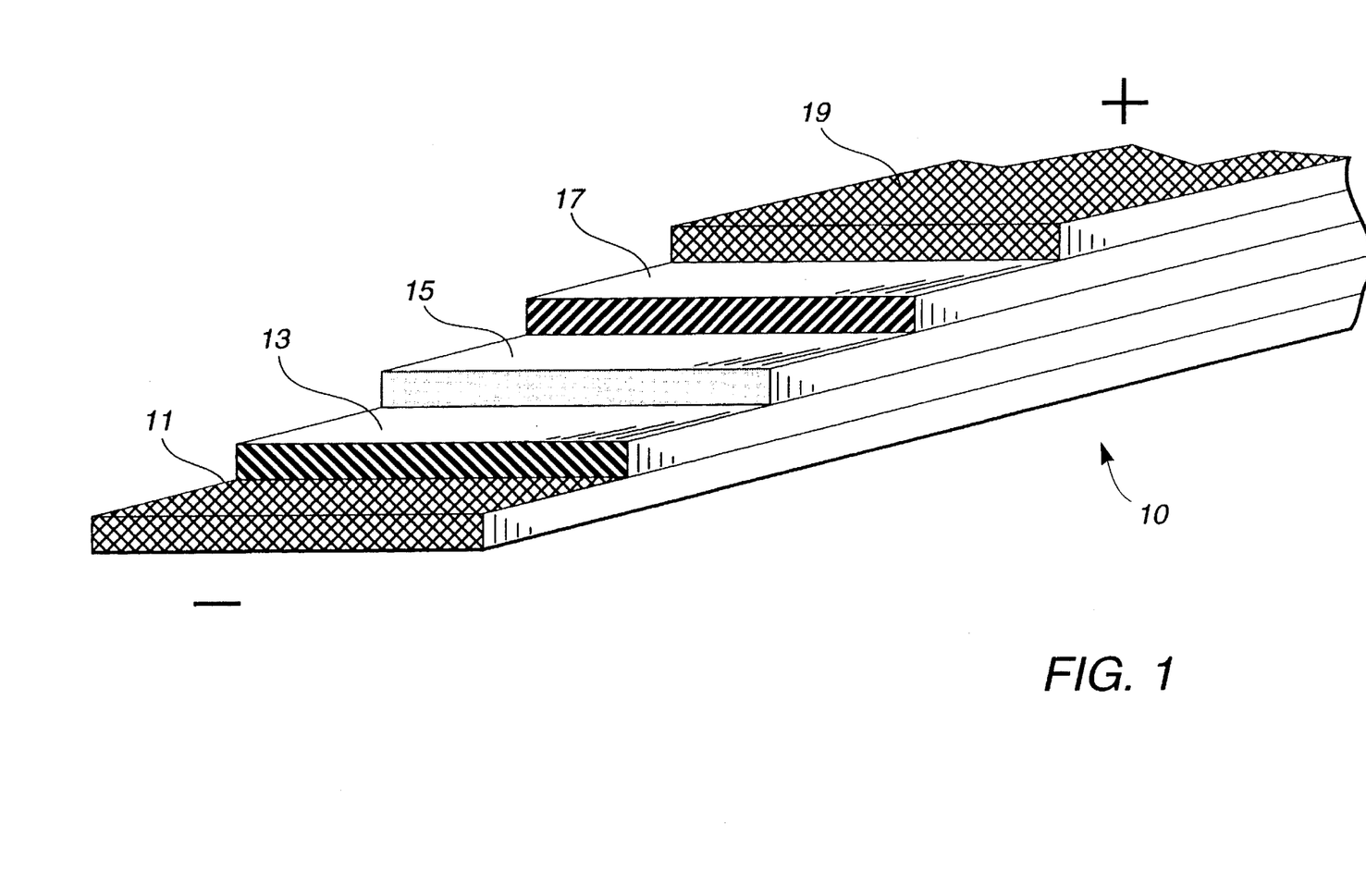
FIG. 1 is an oblique cut-away view of the layered structure of a typical electrolytic cell employed in the invention.

As shown in FIG. 1, the basic structure of an electrolytic cell employed in the present invention comprises a layer 15 of hybrid polymeric separator/electrolyte composition disposed between layers 13, 17 of respective negative and positive polymer matrix electrode composition. Negative and positive collector foils 11, 19, depicted as expanded metal foils, overlie the electrodes, and the assembly 10 is compressed with heating to fuse the polymer components and unify the layers into the laminate cell.

In FIGS. 2–4, the basic cell 10 is shown as the combination of collectors 11, 19 overlying a single layer 14 which in fact represents, for the sake of simplicity and clarity in the drawing, the combination of electrode and separator/electrolyte layers 13, 15, and 17.

Figure 2A:
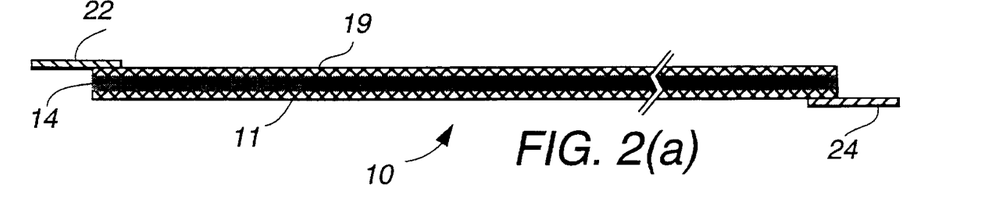
FIGS. 2(a), 2(b), 2(c), and 2(d) depict a series of cross-sectional elevation views of a cell during sequential steps in the shaping of a battery cell according to one embodiment of the invention.
Figure 2B:
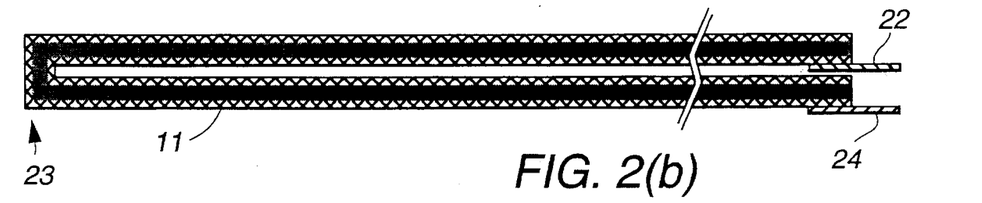

Turning to FIG. 2(a), the cell 10, of some predetermined length, is shown with conductive pads 22, 24 affixed to collectors 11, 19 by common means, such as solder, conductive epoxy, or the like, to provide substantial terminals to which leads may later be connected. In FIG. 2(b), the first step of the present process folds the cell transversely at 23 in the central longitudinal region so that one of the collectors, arbitrarily 19, is folded upon itself at the interior of the structure. This initial fold need not be precisely at the center of the cell length, since, as will later be noted, there may be a preference for the battery terminal to reside at opposite sides of the final battery structure. Again, here and throughout the corresponding FIG.s, for the sake of clarity the facing portions of folded cell 10 are shown spaced apart, though in reality they are in contact.

Figure 2C:
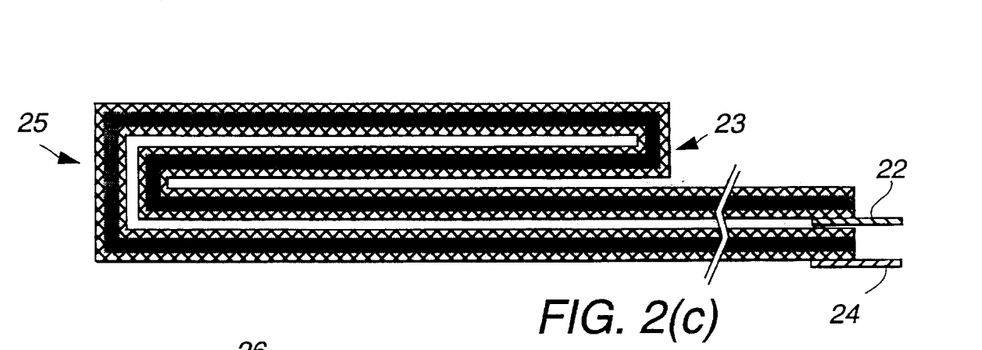
Figure 2D:
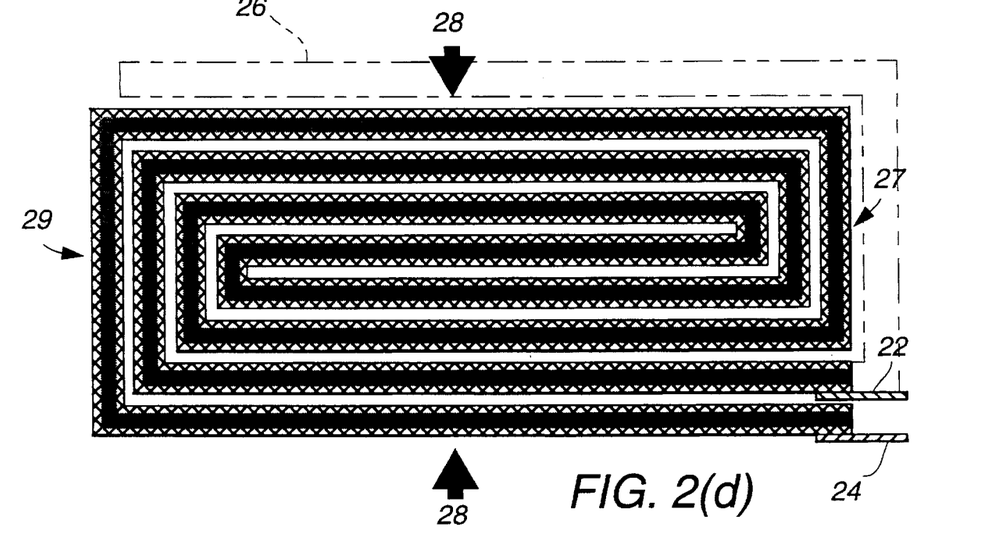

In FIG. 2(c), the folded end 23 of the structure is brought over at a fold 25 into contact with the main section of the cell body. Subsequent folds at 27, 29 complete the process in FIG. 2(d) where common means (not shown) may apply pressure in the direction of arrows 28 to intimately compact the folded layers of the cell into a unified battery structure. Although only three sequential folds 25, 27, 29 are shown in the structure of FIG. 2(d), any number of such folds may be employed, depending on the length of the basic cell 10 and the desired profile dimensions of the final structure. Also, the extension of the inner cell end bearing terminal 22 may be increased to accommodate an additional fold, as shown, for example, in phantom at 26, in order to move that terminal to another location on the surface of the structure, as desired. Throughout the folding procedure, no collector surface contacts another with the opposite polarity, thus the integrity of the cell is maintained.

The same general procedure is followed in FIG. 3 which additionally shows the removal of non-functional weight from the structure to improve the nominal capacity of the battery. As shown in FIG. 3(a), this procedure removes from cell 10 one of each of those sections of collectors 11, 19 which would be in contact as a result of folding operations in FIG. 2. Thus, sections of collectors 11, 19 normally in contact with layer 14 at 31, 36 are dispensed with in structuring cell 10. Subsequent folding of the cell at regions 33, 35 in FIGS. 3(b) and 3(c) thus brings the surfaces of collectors 11, 19 into contact only with their respective cell electrode layers for which they thereafter serve as a common collector. Further folds at 37, 39 in FIG. 3(d) continue this pattern until all electrodes are accommodated with appropriate common collector foils. A final application of heat and pressure at 38 completes the unitary battery structure.

The variant embodiment of the invention shown in FIG. 4 provides the additional advantage that the folds in the collector foils are predominantly at the inside surfaces of the structure, thereby reducing the danger of circuit-interrupting fracture of any of the delicate reticulate collectors in the folded regions of the cell. As in the previous variant, redundant sections of collectors 11, 19 are omitted so that no portions of those elements overlap upon themselves, except in such regions such as 46 in FIG. 4(d) where conductive continuity must be reestablished. Heat and pressure applied at 48 similarly unifies the structure.

The following examples describe a few of the compositions of electrode and separator/electrolyte elements which serve well to formulate basic cells useful in the procedures of the invention.

EXAMPLE 1

A coating composition for a negative electrode layer, such as at 13 in FIG. 1, was prepared by stirring in a lid-covered glass vessel a mixture of 7.0 parts by weight of a commercial microcrystalline graphite (about 5 µm), 2.0 parts 88:12 polyvinylidene fluoride:hexafluoropropylene (VdF:HFP) copolymer (Atochem Kynar FLEX 2822), 3.12 parts dibutyl phthalate, 0.37 parts Super-P conductive carbon, and about 28 parts acetone. The resulting paste may be degassed by briefly applying a reduced pressure to the mixing vessel. A portion of the composition was coated on a glass plate with a doctor blade device gapped at about 0.66 mm. The coated layer was allowed to dry within the coating enclosure under moderately flowing dry air at room temperature for about 10 min to yield a tough, elastic film which was readily stripped from the glass plate. The film was about 0.16 mm thick with a dry basis weight of about 0.23 kg/m$^2$ and was easily cut to yield negative electrode element 13 of about 600×40 mm.

A 620×40 mm copper collector grid 11 (e.g., a MicroGrid precision expanded foil marketed by Delker Corporation) was dip-coated, to enhance the ensuing adherence to its associated electrode element, in a 0.5% acetone solution of the FLEX 2822 VdF:HFP copolymer, air-dried, and oven-heated at about 330° to 350° C. for 5–20 seconds. The heating step may be eliminated by using a dip coating solution of about 3% each of the VdF:HFP copolymer and dibutyl phthalate, or a coating of ethyleneacrylic acid copolymer primer composition (Morton 50-C-12). The resulting negative collector 11 was then laminated with negative electrode membrane 13 in a commercial card-sealing laminator at a temperature of about 110° to 150° C. to form a negative electrode/collector cell subassembly.

A similarly-sized positive electrode/collector subassembly was formed by laminating an acetone-cleaned and polymer dip-coated open mesh aluminum grid 19 of about 50 µm thickness to a positive electrode membrane 17 prepared from a stirred homogeneous mixture of 10.5 parts of $Li_{1+x}Mn_2O_4$, where $0<x \leq i$ (e.g., $Li_{1.05}Mn_2O_4$ prepared in a manner described in U.S. Pat. No. 5,196,279), sieved through 53 µm, 1.61 parts of the VdF:HFP copolymer (FLEX 2822), 1.63 parts dibutyl phthalate, 0.5 parts Super-P conductive carbon, and about 16 parts acetone. The composition was coated at a blade gap of about 1.1 mm to yield an electrode film with dry basis weight of about 0.6 kg/m$^2$.

The electrode/collector subassembly pair were laminated in the same manner with a 600×40 mm strip of an electrolyte/separator element 15. The membrane coating solution for element 15 was prepared by suspending 2.0 parts of the VdF:HFP copolymer (FLEX 2822) in about 10 parts of acetone and 2.0 parts of dibutyl phthalate (DBP) and warming the mixture to about 50° C. with occasional agitation to facilitate dissolution. Then 0.8 parts of fumed silanized silica (Cabot Chemical) was suspended by stirring into the copolymer solution. A portion of the suspension was coated on a glass plate with a doctor blade device gapped at about 0.5 mm and air dried for about 10 min to yield the tough, elastic electrolyte/separator membrane 15 which was about 85 µm thick with a dry basis weight of about 0.1 kg/m$^2$.

The electrode subassemblies 11, 13 and 17, 19 and the electrolyte/separator 15 were assembled as shown in FIG. 1 and laminated as noted above. To facilitate later attachment of conductor leads to the respective grid collectors 11, 19 a pair of metal foil tabs 22, 24 were affixed with conductive epoxy adhesive. The resulting cell assembly appeared as shown in cross-section in FIG. 2(a). As earlier noted, in order to simplify this and other views of the assemblies in the drawings, the combination of electrode and intermediate electrolyte/separator layers are represented by the single layer designated as 14 in FIG. 2(a). Also, the cell is represented as being of indefinite length, since that parameter is entirely at the discretion of the manufacturer and will be influenced simply by the desired capacity of the ultimate battery.

The first step in the battery structuring process is shown in FIG. 2(b) where the cell 10 was folded at a region 23, approximately half way along its length, to bring the resulting two surface sections of collector 19 into contact within the folded cell. Thus, the opposite polarity collector elements are thereafter separated by layer 14, and the potential for short-circuiting is eliminated without resort to weighty intermediate insulating sheets or membranes. In the next step, represented at FIG. 2(c), the cell was folded a second time in a region 25 which is generally selected to be at a distance from the end fold at 23 which is substantially an integral fraction of the overall length of cell 10. In this manner, further sequential folding, as at regions 27, 29 in FIG. 2(d), resulted in a generally symmetrical folded, or rolled, battery structure which was finally sealed into a unitary body by the application of heat and pressure as indicated at 28.

Figure 5:
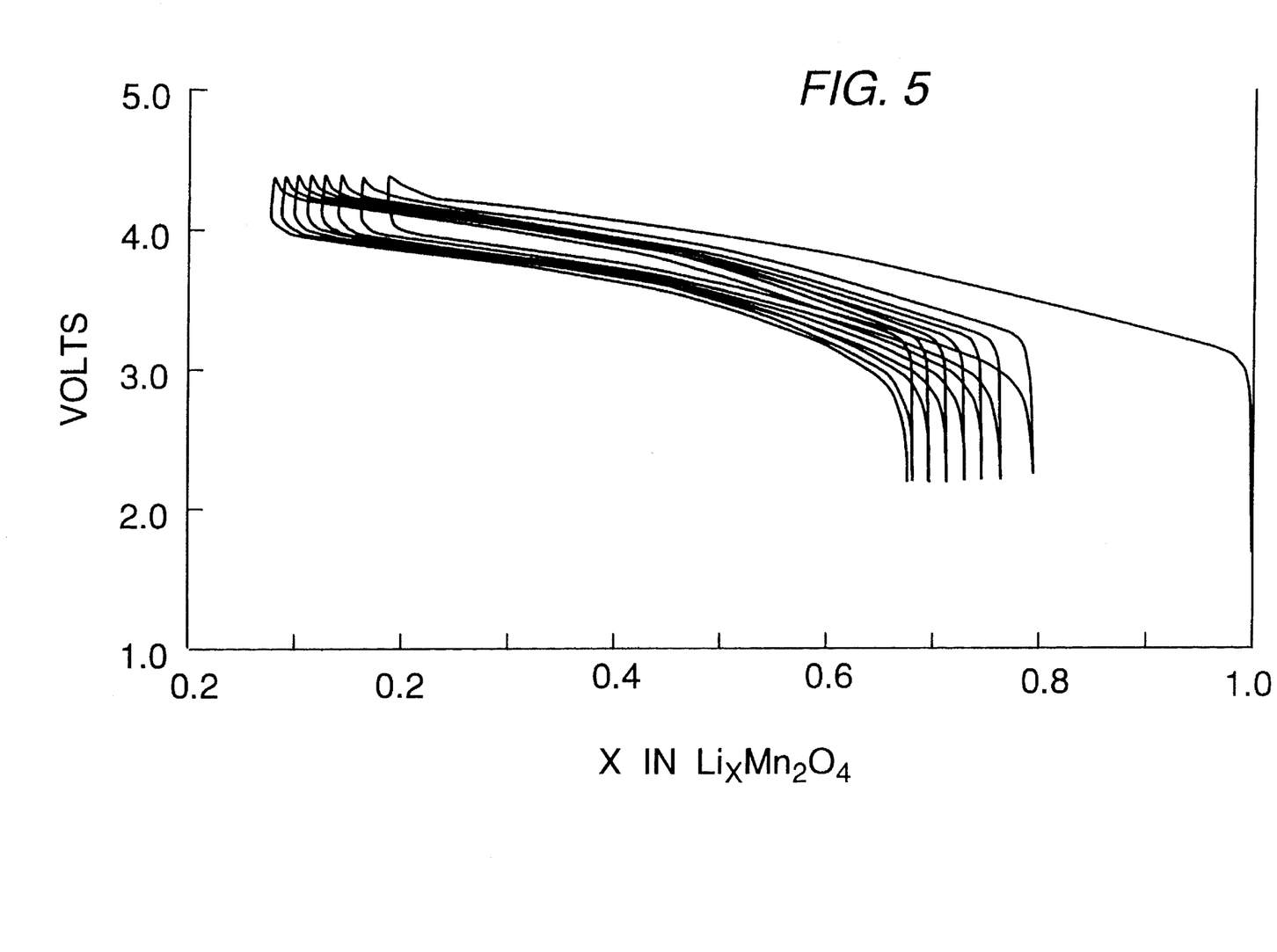
FIG. 5 is graph of charge/discharge cycle performance of a typical battery embodying the present invention.

The resulting battery structure was then immersed in stirred diethyl ether three times for about 20 minutes each during which the ether solvent penetrated through the grids of collectors 11, 19 and into the structure layers to extract a substantial portion of the DBP plasticizer. After removal of the extracting solvent with simple air drying, the battery was activated in preparation for charge/discharge cycling by immersion under a substantially moisture-free atmosphere in a 1M electrolyte solution of $LiPF_6$ in 50:50 ethylene carbonate (EC):dimethyl carbonate (DMC) for about 40 minutes during which the laminated cell imbibed about 31% of its extracted weight. Following a mild wiping with absorbent materials to remove surface electrolyte, the activated battery structure was hermetically heat-sealed, but for extending conductor wires soldered to terminal tabs 22, 24, in a close-fitting envelope (not shown) of moisture-proof barrier material, such as a polyolefin/aluminum foil/polyester laminate sheeting commercially used for foodstuff enclosures. The charted results of a series of charge/discharge cycles as shown in FIG. 5 confirmed the stable, high-capacity operation of the battery.

The battery structures of the present invention may be activated with any of the numerous compositions used as liquid electrolyte solutions. Notably, the electrolyte solutions may comprise such organic solvents as dimethyl carbonate, ethylene carbonate, diethoxyethane, dimethyl carbonate, propylene carbonate, dimethoxyethane, dipropyl carbonate, and mixtures thereof. Also, in the formulation of the activating electrolyte solutions, other useful lithium salts, including $LiClO_4$, $LiN(CF_3SO_2)_2$, $LiBF_4$, $LiCF_3SO_3$, $LiAsF_6$, and $LiSbF_6$, may be employed in solution concentrations of between about 0.5 and 2M. Of particular utility are the exceptional ethylene carbonate/dimethyl carbonate compositions of $LiPF_6$ and mixtures with $LiBF_4$ described in U.S. Pat. No. 5,192,629.

EXAMPLE 2

Another polymeric matrix composition useful in preparing the battery structures of the invention comprises polyvinyl chloride (PVC), such as the Geon 30 or Geon 121 products of Goodrich Chemicals. In preparing this exemplary battery structure, electrolyte/separator member 15 was formulated of a suspension of 4 parts fumed silanized silica in a solution of 6 parts PVC (Geon 30), 10 parts dibutyl phthalate (DBP), and 45 parts tetrahydrofuran (THF) which was initially stirred at about 50° C. and then cooled to room temperature with continued stirring. The suspension was cast onto a glass plate at a thickness of about 0.5 mm and slowly dried under cover in flowing air over about 10 minutes to produce a clear, elastic film of about 0.1 mm thickness which stripped readily from the glass substrate. A segment of the film was extracted of DBP with diethyl ether and then immersed in 1M $LiPF_6$/EC/DMC for 24 hours during which it imbibed about 40% by weight of the electrolyte solution. The ionic conductivity of the film was about 1.0 mS/cm.

A positive electrode composition was prepared by extended room temperature stirring of 22 parts $Li_{1+x}Mn_2O_4$, 5.9 parts PVC, 9 parts DBP, 2.3 parts Super-P conductive carbon and 55 parts THF. The homogeneous paste was cast onto a glass plate at about 1 mm thickness and air dried slowly under cover for about 30 min to yield a continuous elastic film about 0.2 mm thick. A strip 17 of the resulting film was laminated to an aluminum collector grid element 19 as described in Example 1.

In similar fashion, a negative electrode 13 was prepared from a composition of 10.5 parts microbead carbon coke (MBMC 25-10, Osaka Gas Co.), 3 parts PVC, 4.7 parts DBP, 0.6 parts of Super-P carbon, and about 20 parts THF. The resulting paste was cast on a glass plate at about 0.5 mm thickness and air dried to an elastic film about 0.15 mm thick. A strip of this electrode composition film was laminated with a strip of copper grid collector foil 11, and this subassembly was arranged with the positive subassembly and the separator element in the manner shown in FIG. 1. The battery cell strip was then laminated in the double-roll laminating device at about 160° C. and thereafter folded and finally laminated to form a unitary battery body as shown in FIG. 2.

Days later, a substantial portion of the DBP plasticizer was extracted from the laminated battery structure by repeated immersion in 2–4 bodies of refreshed diethyl ether over a period of about 20 min. After drying, the battery was activated by immersing for about 45 min in a 1M solution of $LiClO_4$ in 50:50 ethylene carbonate (EC):propylene carbonate (PC) during which time the polymeric components of the battery were reswollen by imbibition of the electrolyte solution to substantially the same weight as prior to extraction. The battery was then immediately sealed in a moisture-proof enclosure to prevent deterioration of the electrolyte. Cycling tests showed stable results similar to those in FIG. 5.

Other specimens of the foregoing examples were extracted and activated with similar success by using in place of the diethyl ether such selective organic extracting solvents as pentane, petroleum ether, hexane, and cyclohexane, and employing 0.5 to 2M electrolyte solutions of commonly used lithium salts, such as $LiAsF_6$, $LiBF_4$, $CF_3SO_3Li$, and mixtures, in other solvents as diethyl carbonate, dimethoxyethane, and mixtures with those noted earlier.

EXAMPLE 3

Useful electrode and electrolyte/separator compositions were likewise prepared with rubber polymers such as the 43% acrylonitrile-butadiene rubber (NBR-43) of Zeon Chemicals. In this example, a stock solution of the polymer was prepared of 5 parts by weight NBR-43, 0.24 parts benzoyl peroxide, and 50 parts acetone. An electrolyte/separator layer was prepared by thoroughly mixing with 5 parts of the stock solution 0.8 parts of silanized silica and 1.6 parts of propylene carbonate, forming a 0.5 mm layer of the mixture on an aluminum sheet, and pressing the layer at about 150° C. for 20 min under a second such sheet spaced at about 0.25 mm. After cooling to room temperature, an extracted and electrolyte-activated sample of the layer exhibited an ionic conductivity of about 0.9 mS/cm.

Electrode layers were similarly prepared of 2 parts NBR solution, 0.7 parts propylene carbonate plasticizer, and 0.1 parts of Super-P conductive carbon with 1.1 parts of coke for the negative, and 1.2 parts of $Li_{1+x}Mn_2O_4$ for the positive electrode. Grid collector foils were added and the cell was laminated prior to being folded and unified in the described manner, extracted, and activated to yield an effective battery.

EXAMPLE 4

Yet another type of polymer matrix composition was useful in preparing the present batteries. In this example, 0.6 parts by weight of polyacrylonitrile (PAN) powder (Aldrich Chemical) was mixed with 0.4 parts fumed silanized silica (Cab-O-Sil TS 530) and 4.0 parts of propylene carbonate (PC) to form a slurry. A portion of the mixture was spread on an aluminum sheet and pressed for 5 min at about 145° C. beneath a second such sheet spaced at about 0.25 mm. After cooling to room temperature, the resulting clear, elastic PC-plasticized film was cut into a strip to form an electrolyte/separator cell member. A sample of the film extracted with diethyl ether and activated with a 1M solution of $LiPF_6$ in 1:1 EC:PC exhibited an ionic conductivity of about 0.9 mS/cm.

A positive electrode was similarly prepared from a composition of 1.05 parts of $Li_{1+x}Mn_2O_4$, 0.28 parts PAN powder, 0.11 parts Super-P carbon, and 0.86 parts PC pressed between sheets spaced at about 0.5 mm. A negative counter-electrode was pressed at about 0.25 mm from a composition of 0.7 parts of MBMC 25-10 coke, 0.2 parts PAN powder, 0.04 parts Super-P carbon, and 0.62 parts PC. These electrode materials were cut into strips, backed with respective collector grid strips, assembled with the electrolyte member, and laminated at about 115° C. to form the basic cell 10 of FIG. 1. The cell was then folded in the manner of FIG. 2, extracted with diethyl ether and activated with the 1M electrolyte solution of $LiPF_6$:EC:PC before being sealed in its moisture-proof enclosure. Cycling tests showed stability comparable to that in FIG. 5.

EXAMPLE 5

Utilizing the cell member compositions of Example 1, the battery structure of FIG. 3 was prepared by initially laminating collector members 11, 19 of reduced length to the respective electrode elements 13, 17 prior to combining those elements with electrolyte member 15 to form layer 14. Collector 19 was sized to be essentially half the length of cell 10, while outer collector 11 was allowed about one fold span additional length to ensure contact with the facing electrode surface formed upon making the second fold. Thereafter, the remaining collector surface areas contact and serve as common collector elements for the respective facing electrode surfaces. Depending on the number of folds in the battery structure, the saving in collector element weight may range from about 40 to 50%. The final laminated structure was extracted of DBP plasticizer and hermetically sealed in an enclosing envelope with about 30% of its own weight of a 1M activating electrolyte solution of equimolar $LiPF_6$ and $LiBF_4$ in 1:1 EC:DMC to yield an activated battery ready for initial charging.

Figure 3A:
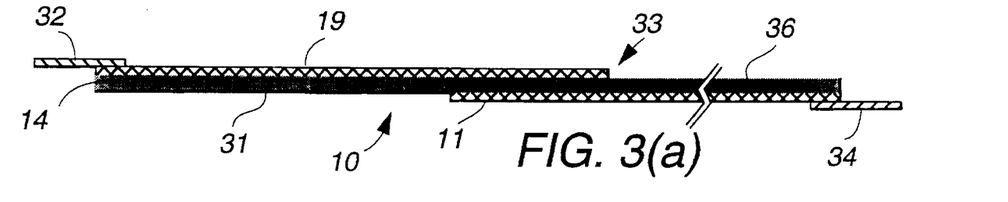
FIGS. 3(a), 3(b), 3(c), and 3(d) similarly depict the series of steps in another embodiment on the invention.
Figure 3B:
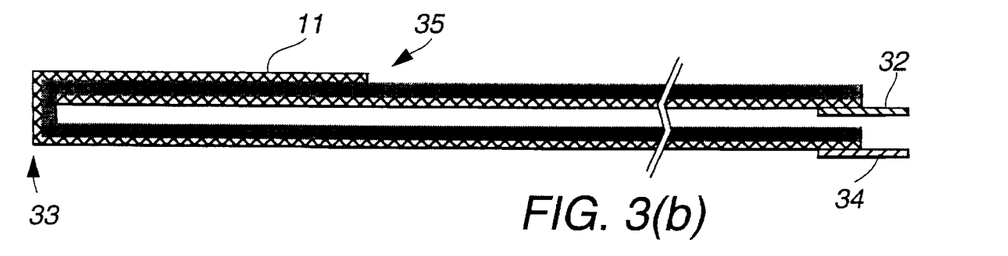
Figure 3C:
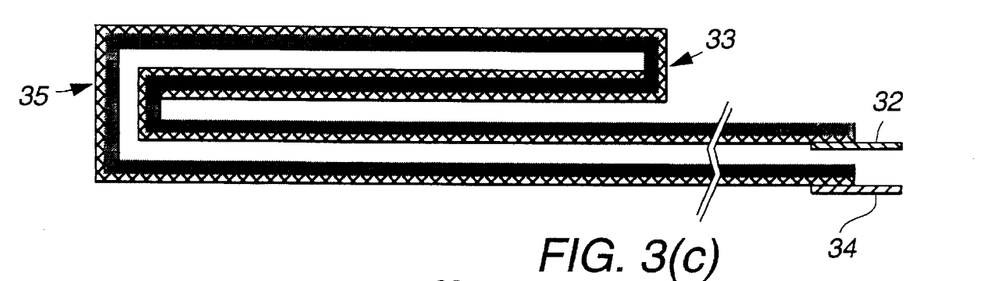
Figure 3D:
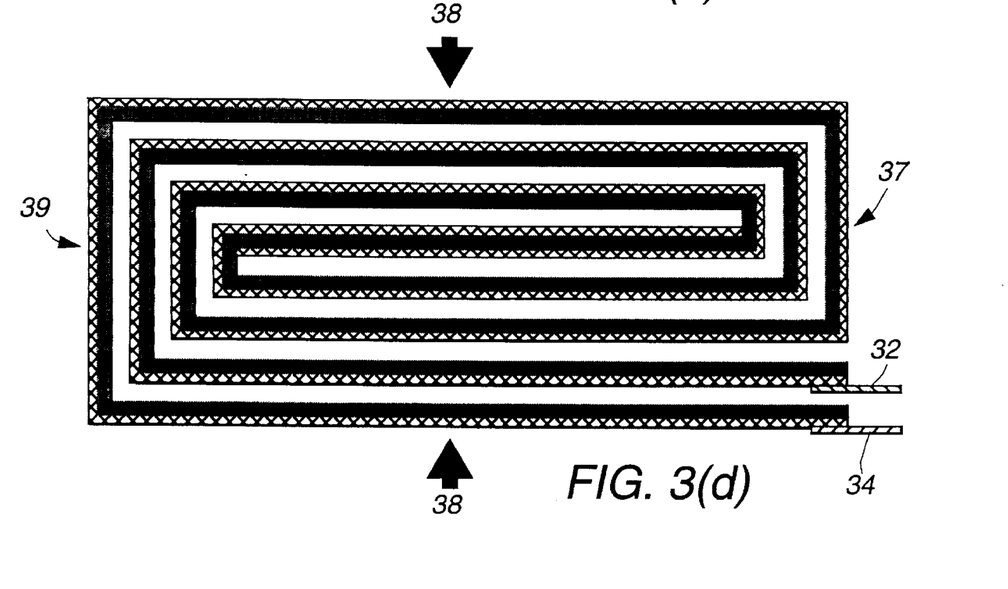
Figure 4A:
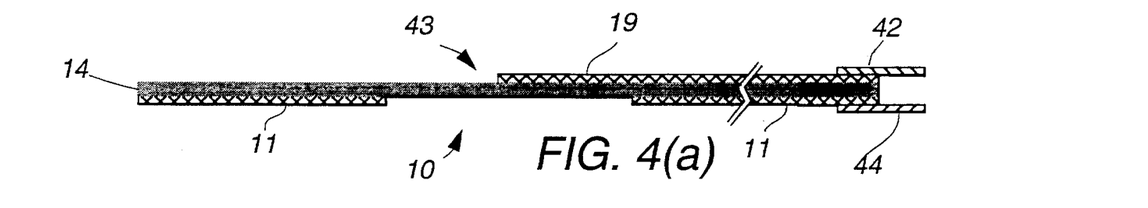
FIGS. 4(a), 4(b), 4(c), and 4(d) similarly depict the series of steps in yet another embodiment on the invention.
Figure 4B:
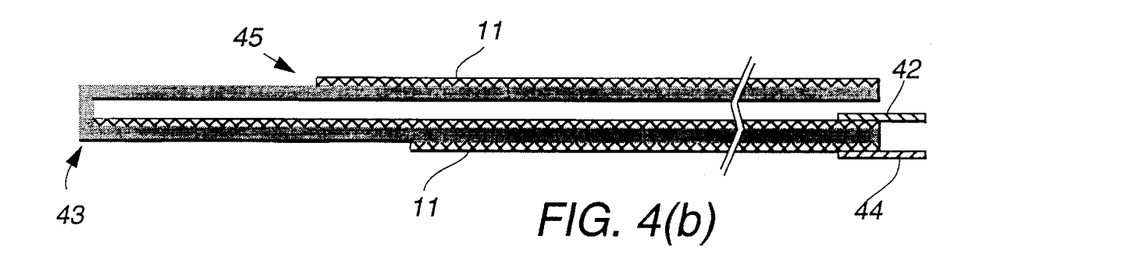
Figure 4C:
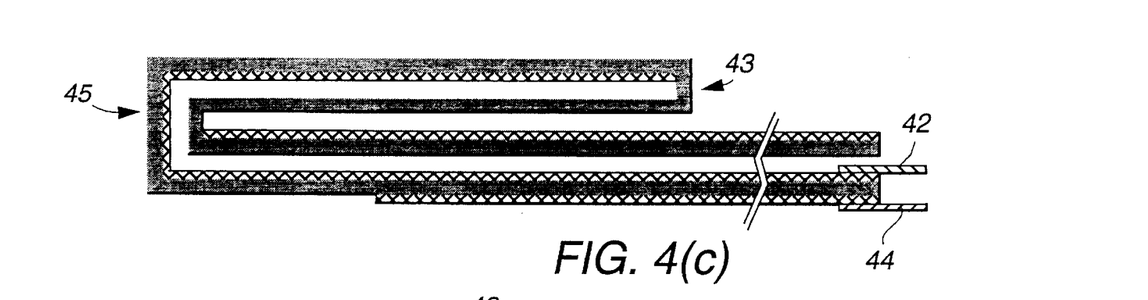
Figure 4D:
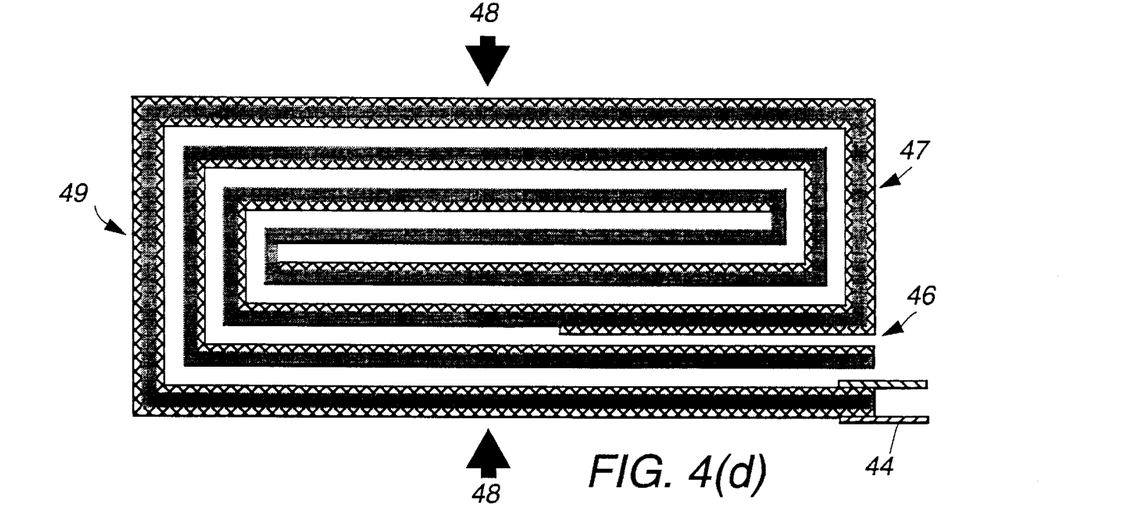

Although the present sample was assembled longitudinally, that is to say, with the view of FIG. 3(a) representing the longitudinal cross-section of the cell, a more productive procedure would have the collector grid foils arranged along extended parallel paths on continuous lengths of electrodes followed by lateral cutting of the laminated assembly such that FIG. 3(a) would represent the lateral cross-sectional view of the assembly.

The collector arrangement of FIG. 4 similarly represents an economy of weight, but provides an additional advantage that the outer surface of the cell in the regions of initial folds, such as at 43, 45, is devoid of a collector grid which might become fractured due to folding stress. An outer collector foil thus appears only at the final, less severe folds 47, 49 where such stress is minimal. Final lamination, extraction, and activation operations are as described above to provide an efficient active battery.

While the above description has related in large measure the preparation of a number of battery structures, other variants, such as batteries of increased voltage comprising multiple, series-arranged cells, are likewise to be included within the scope of the invention as set out in the appended claims.

What is claimed is:

1. A rechargeable battery comprising a flexible laminate electrolytic cell in which a hybrid electrolyte/separator layer of polymer composition comprising one or more plasticizers is interposed between positive and negative electrode layers of lithium-ion-intercalating plasticized polymer compositions bearing respective current collector foils characterized in that a) said battery comprises an elongate cell having two longitudinal ends folded upon itself about a first transverse fold at its longitudinal mid-region to enclose in facing contact with each other within the resulting structure substantial areas of one said electrode layer and its associated collector foil; and b) substantial areas of the other said electrode layer and its associated collector foil are in facing contact with each other throughout said structure.

2. A battery according to claim 1 characterized in that said structure comprises sequential transverse folds substantially parallel to said first transverse fold.

3. A battery according to claim 1 characterized in that said structure spirals outwardly about said first transverse fold toward the initial longitudinal ends of said cell.

4. A battery according to claim 1 characterized in that said collector foils are reticulated to thereby allow the passage of fluid therethrough.

5. A battery according to claim 4 characterized in that the one or more plasticizers comprising said cell layers have been extracted and substantially replaced with an electrolyte solution comprising a lithium salt in an organic solvent.

6. A battery according to claim 1 characterized in that a polymer comprising one or more of said cell layers is selected from the group consisting of polyvinylidene fluoride:hexafluoropropylene copolymers, polyvinyl chloride polymers, acrylonitrile:butadiene copolymers, and polyacrylonitrile polymers.

7. A battery according to claim 1 characterized in that a substantial portion of one of facing areas of like polarity electrode layer surfaces in said structure is devoid of collector foil, whereby the collector foil associated with the other of said facing areas is disposed between said electrode layer surfaces to serve as a common collector.

8. A battery according to claim 7 characterized in that the layers of said structure are laminated into a unitary battery body.

9. A battery according to claim 7 characterized in that
   a) said structure spirals outwardly about said first transverse fold toward the initial longitudinal ends of said cell; and
   b) said collector-devoid electrode layer areas are situated at the outer spiral circumference in said structure.

10. A method of making a rechargeable battery comprising a flexible laminate electrolytic cell in which a hybrid electrolyte/separator layer of polymer composition comprising one or more plasticizers is interposed between positive and negative electrode layers of lithium-ion-intercalating plasticized polymer compositions bearing respective current collector foils
   characterized in that
   a) an elongate cell having two longitudinal ends is folded upon itself about a first transverse fold at its longitudinal mid-region to enclose in facing contact with each other within the resulting structure substantial areas of one said electrode layer and its associated collector foil; and
   b) said structure is further formed in such a manner that substantial areas of the other said electrode layer and its associated collector foil are in facing contact with each other throughout said structure.

11. A method according to claim 10 characterized in that as a result of said further forming, said structure is sequentially folded in transverse folds substantially parallel to said first transverse fold.

12. A method according to claim 10 characterized in that as a result of said further forming, said structure is spiralled outwardly about said first transverse fold toward the initial longitudinal ends of said cell.

13. A method according to claim 10 characterized in that selected areas of said cell electrode layers are initially rendered devoid of collector foil, whereby substantially only one of facing areas of like polarity electrode layer surfaces in said further-formed structure bears a collector foil which is disposed between said electrode layer surfaces to serve as a common collector.

14. A method according to claim 13 characterized in that said further-formed structure is laminated into a unitary battery body by the application of heat and pressure.

15. A method according to claim 10 characterized in that
   a) said collector foils are reticulated to thereby allow the passage of fluid therethrough;
   b) the one or more plasticizers comprising said cell layers are extracted by application of a solvent which is substantially inert to said polymers; and
   c) the extracted plasticizer is substantially replaced with an electrolyte solution comprising a lithium salt in an organic solvent.

\* \* \* \* \*